(12) United States Patent
Nelson et al.

(10) Patent No.: US 6,848,715 B2
(45) Date of Patent: Feb. 1, 2005

(54) FOLDED RIGID KNEE AIRBAG

(75) Inventors: Earl H. Nelson, Hooper, UT (US); Bradley W. Smith, Ogden, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 138 days.

(21) Appl. No.: 10/227,680

(22) Filed: Aug. 26, 2002

(65) Prior Publication Data

US 2004/0036265 A1 Feb. 26, 2004

(51) Int. Cl.⁷ .................. B60R 21/22; B60R 21/04
(52) U.S. Cl. ...................... 280/753; 280/730.1
(58) Field of Search ................... 280/751–753, 280/728.1, 730.1

(56) References Cited

U.S. PATENT DOCUMENTS

| | | | | |
|---|---|---|---|---|
| 4,944,529 A | * | 7/1990 | Backhaus | 280/743.1 |
| 5,382,051 A | * | 1/1995 | Glance | 280/751 |
| 5,445,414 A | * | 8/1995 | Pittman et al. | 280/743.1 |
| 5,615,914 A | * | 4/1997 | Galbraith et al. | 280/743.1 |
| 5,697,640 A | * | 12/1997 | Lalonde | 280/743.1 |
| 5,839,756 A | | 11/1998 | Schenck et al. | 280/743.1 |
| 5,868,422 A | | 2/1999 | Galbraith et al. | 280/732 |
| 6,039,380 A | * | 3/2000 | Heilig et al. | 296/70 |
| 6,203,057 B1 | * | 3/2001 | Spencer et al. | 280/730.1 |
| 6,213,497 B1 | * | 4/2001 | Spencer et al. | 280/730.1 |
| 6,543,801 B2 | * | 4/2003 | Lebaudy et al. | 280/728.1 |
| 6,688,643 B2 | * | 2/2004 | Schneider | 280/753 |

* cited by examiner

Primary Examiner—Ruth Ilan
(74) Attorney, Agent, or Firm—Sally J. Brown

(57) ABSTRACT

A folded rigid knee airbag for preventing the lower body portion of a vehicle occupant from being propelled forward during a collision is provided. The folded rigid knee airbag includes a back panel and a front panel attached to the back panel. Both the front panel and the back panel may be made from a rigid material, such as sheet metal. The back panel may include first and second accordion folds, and first and second vertical folds. The airbag may be in communication with an inflator. During discharge of the inflator, the accordion folds and the vertical folds unfold to form four substantially planar walls. The accordion folds and the vertical folds enable the front panel to remain substantially flat and maintain a substantially uniform cross-sectional area during inflation.

28 Claims, 9 Drawing Sheets

FOLDED RIGID KNEE AIRBAG

BACKGROUND OF THE INVENTION

1. Field of the Invention

The present invention relates to an airbag designed to protect the occupants of a vehicle during a collision. More specifically, the invention relates to a folded rigid knee airbag that prevents the lower body portion of a vehicle occupant from being propelled forward during a collision.

2. Description of Related Art

Inflatable airbags enjoy widespread acceptance as passenger restraints for use in motor vehicles. In fact, vehicle manufacturers are now required to install airbags in most new vehicles manufactured for sale in the United States.

Airbags are often installed in the steering wheel and in the dashboard on the passenger side of a car. These airbags are typically covered by a trim cover panel that is made of rigid plastic, and that is configured to be opened by the pressure created by the deploying airbag. These airbags are typically used for the primary deceleration of a vehicle occupant since, in a large fraction of collisions, the occupant is accelerated forward toward the windshield. Thus, such an airbag will be referred to herein as a "primary airbag."

A primary airbag is typically in communication with an inflator, which is typically in communication with a sensor mechanism configured to sense an impact to the vehicle. Upon receipt of an electrical signal transmitted from the sensor mechanism, the inflator discharges, causing the primary airbag to inflate. In its inflated position, the primary airbag prevents the upper body portion of a vehicle occupant from being propelled forward toward the windshield. When this occurs, there is a tendency for the lower body portion of the occupant to be propelled forward and under the primary airbag. This tendency is referred to as "submarining," and may be quite pronounced when the occupant is not properly restrained by a seat belt.

Knee airbags have been developed in order to prevent submarining. Knee airbags deploy during a collision event and engage an occupant's knees or lower legs, thus holding the occupant in place on the seat and preventing submarining.

One known rigid knee airbag is a metallic bladder which includes two metal sheets that are welded together along the edges. However, during deployment the center of such a metallic bladder expands to a greater extent than the peripheral regions. Therefore, the surface of such a metallic bladder can interact with a vehicle occupant at an angle during an accident.

Another known rigid knee airbag is an inflatable bladder that includes a forward main panel and a rearward main panel. Each of the main panels has a generally octagonal shape prior to inflation. The inflatable bladder also includes right and left end panels. Prior to inflation, the end panels are folded to form pleat folds. However, such a knee airbag has a projected area prior to deployment which is much larger than the ultimate reaction surface presented to the occupant. Such an airbag is therefore inefficient to package inside a vehicle.

Accordingly, it would be an advancement in the art to provide a folded rigid knee airbag with a front panel that remains substantially flat during inflation. It would be a further advancement in the art to provide a folded rigid knee airbag wherein the cross-sectional area of the airbag in its inflated configuration is substantially equal to the cross-sectional area of the airbag in its compact configuration. The present invention provides these advancements in a novel and useful way.

SUMMARY OF THE INVENTION

The apparatus of the present invention has been developed in response to the present state of the art, and in particular, in response to the problems and needs in the art that have not yet been fully solved by currently available folded rigid knee airbags. Thus, it is an overall objective of the present invention to provide a folded rigid knee airbag having a front panel that remains substantially flat during inflation, and also having a cross-sectional area that does not change substantially during inflation.

To achieve the foregoing objective, and in accordance with the invention as embodied and broadly described herein, a folded rigid knee airbag is provided. The folded rigid knee airbag may be positioned in any number of locations within a vehicle. For example, a primary airbag may be contained within a steering wheel. The folded rigid knee airbag may then be mounted beneath the primary airbag in a lower portion of an instrument panel within the vehicle. In an alternative embodiment, the airbag may be positioned underneath a front seat.

The airbag includes a back panel and a front panel. Both the front panel and the back panel may be made from a rigid material, such as sheet metal. The front panel may be attached to a decorative trim panel which serves as a bolster for contacting the lower body portion of the occupant during a collision involving the vehicle, and which also allows the airbag to be integrated into the interior of the vehicle.

The front panel may be attached to the back panel in any number of ways. For example, the peripheral region of the front panel may be folded around the peripheral region of the back panel. A plurality of spot welds may then be used to attach the front panel to the back panel. Alternatively, the area of the front panel may be substantially equal to the area of the back panel, and the peripheral regions of the front panel and the back panel may be welded together in a continuous fashion.

The airbag is in communication with an inflator through an inflator interface. The inflator may be of any suitable type or construction for supplying a medium for inflating the airbag. In one embodiment, the inflator interface may take the form of a rectangular orifice that is configured to receive an adapter unit. The adapter unit may include a hollow rigid box with an orifice in one side, so that the inflator may be inserted directly in the orifice. In another embodiment, the inflator interface may be configured so that the inflator may be inserted directly into the back panel.

The back panel is configured such that the front panel remains substantially flat during discharge of the inflator. In one embodiment, first and second accordion folds extend from the left side edge to the right side edge of the back panel in a horizontal direction. First and second vertical folds protrude out of the front side of the back panel in a vertical direction. The first accordion fold intersects the first vertical fold near the upper edge and the left side edge of the back panel, the first accordion fold intersects the second vertical fold near the upper edge and the right side edge of the back panel, the second accordion fold intersects the first vertical fold near the lower edge and the left side edge of the back panel, and the second accordion fold intersects the second vertical fold near the lower edge and the right side edge of the back panel. During discharge of the inflator, the accordion folds and the vertical folds unfold to form four substantially planar walls.

In one embodiment, the front panel is disposed substantially parallel to the back panel after inflation. Such an airbag may be used in a vehicle where the lower portion of the instrument panel is substantially parallel to the lower body of the vehicle occupant. In some vehicles, however, the lower portion of the instrument panel is disposed at an angle relative to the lower body of the vehicle occupant. Thus, in an alternative embodiment, the front panel may be disposed at an angle relative to the back panel after inflation.

In such an airbag, the second accordion fold may be substantially larger than the first accordion fold. In addition, the height of the first and second vertical folds may increase moving in a direction from the upper edge to the lower edge of the back panel. During discharge of the inflator, the airbag unfolds so that the substantially planar wall formed by the second accordion fold is taller than the substantially planar wall formed by the first accordion fold, thereby enabling the front panel to be disposed at an angle relative to the back panel after inflation.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1 through 9, is not intended to limit the scope of the invention, as claimed, but is merely representative of presently preferred embodiments of the invention.

Figure 1:
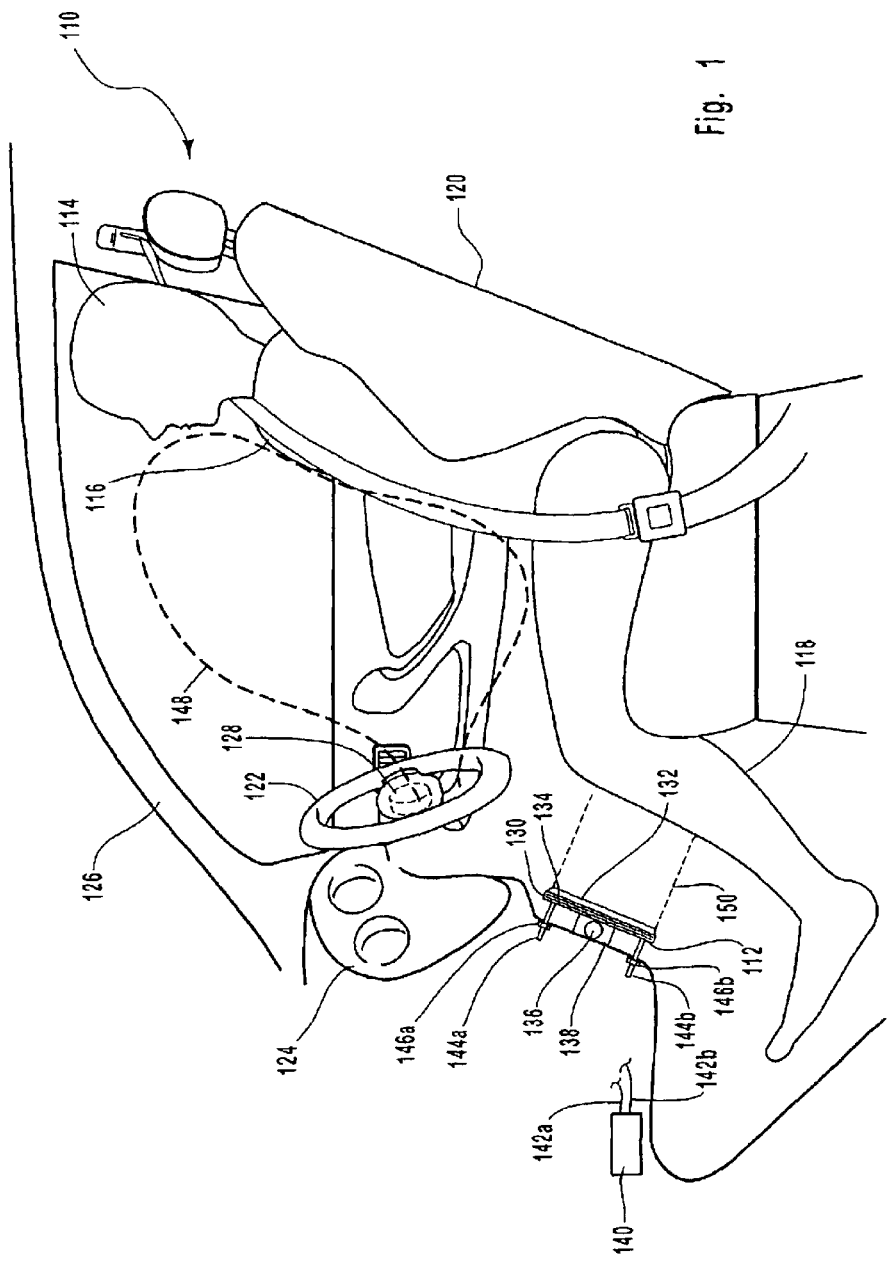
FIG. 1 is a side cutaway view of an interior portion of a vehicle having a folded rigid knee airbag installed.

FIG. 1 is a side cutaway view of an interior portion of a vehicle 110 having a folded rigid knee airbag 112 installed. A vehicle occupant 114 having an upper body portion 116 and a lower body portion 118 is shown seated in a front seat 120. The front seat 120 is located in front of a steering wheel 122, an instrument panel 124, and a windshield 126. A primary airbag 128 is contained within the steering wheel 122. The folded rigid knee airbag 112 is mounted in a lower portion of the instrument panel 124 within the vehicle 110.

The location of the folded rigid knee airbag 112 in FIG. 1 is exemplary only. The folded rigid knee airbag 112 may be positioned in any number of locations. For example, in one alternative embodiment, the airbag 112 may be positioned underneath the front seat 120.

The folded rigid knee airbag 112 includes a back panel 130 and a front panel 132 which is attached to a decorative trim panel 134. The decorative trim panel 134 serves as a bolster for contacting the lower body portion 118 of the occupant 114 during a collision involving the vehicle 110. The trim panel 134 also allows the airbag 112 to be integrated into the interior of the vehicle 110.

In the embodiment shown in FIG. 1, the airbag 112 is in communication with an inflator 136 through an adapter unit 138. In an alternative embodiment, the inflator 136 may be in direct communication with the airbag 112. The vehicle 110 also includes a sensor mechanism 140, which is configured to sense an impact to the vehicle 110. A pair of lead wires 142a–b are attached to the sensor mechanism 140. The lead wires 142a–b provide electrical communication between the sensor mechanism 140 and the inflator 136. The airbag 112 is attached to the instrument panel 124 by a pair of connector studs 144a–b held in place by a pair of nuts 146a–b.

Upon receipt of an electrical signal transmitted from the sensor mechanism 140, the primary airbag 128 and the folded rigid knee airbag 112 inflate into their respective inflated positions 148 and 150. In its inflated position 148, the primary airbag 128 prevents the upper body portion 116 of the occupant 114 from being propelled forward toward the windshield 126. When this occurs, there is a tendency for the lower body portion 118 of the occupant 114 to be propelled forward and under the primary airbag 128. This tendency is referred to as submarining, and may be quite pronounced when the occupant 114 is not properly restrained by a seat belt. In its inflated position 150, the folded rigid knee airbag 112 prevents submarining, i.e., prevents the lower body portion 118 of the vehicle occupant 114 from sliding forward.

Figure 2:
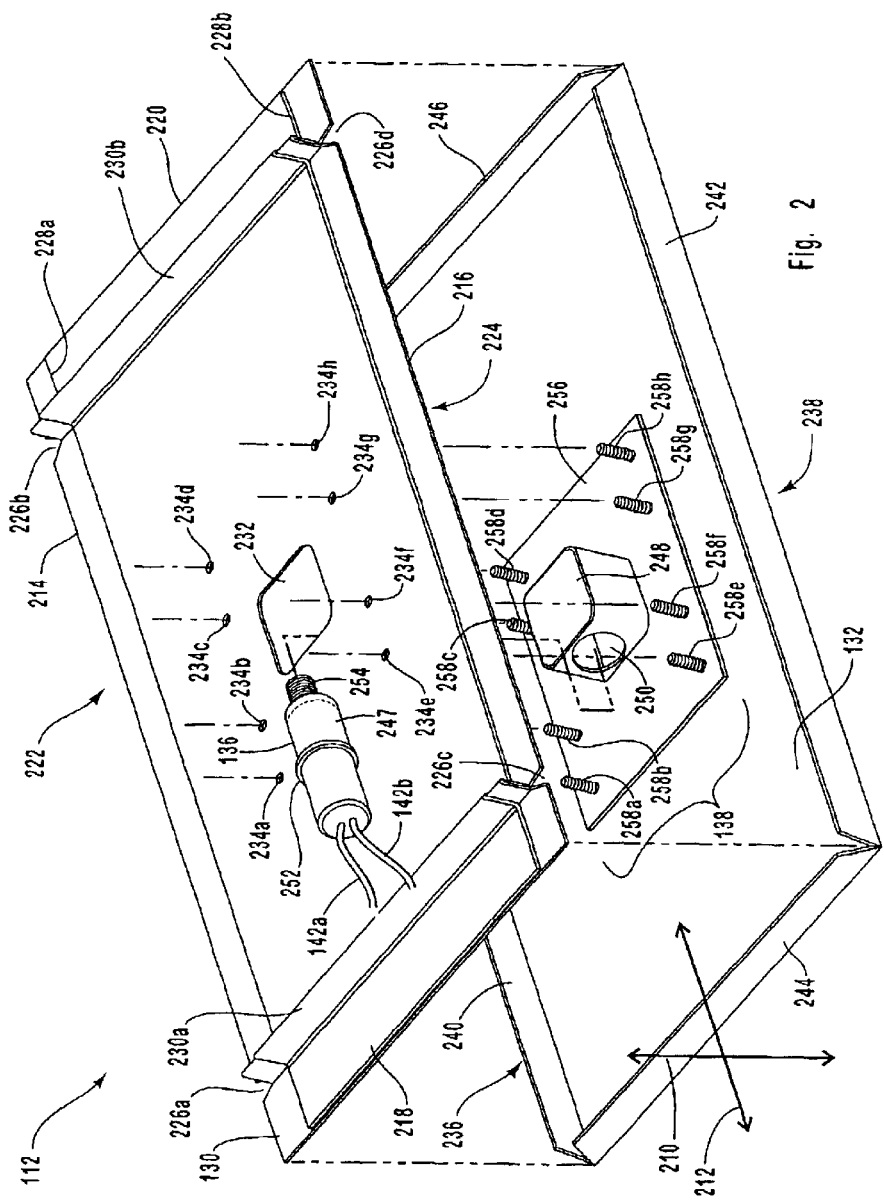
FIG. 2 is an exploded perspective view of the folded rigid knee airbag of FIGS. 1–2.

FIG. 2 is an exploded perspective view of the folded rigid knee airbag 112. As stated previously, the folded rigid knee airbag 112 includes a back panel 130, a front panel 132, an inflator 136, an inflator interface 232, and an adapter unit 138. The folded rigid knee airbag 112 also has a vertical direction 210 and a horizontal direction 212.

The back panel 130 has an upper edge 214, a lower edge 216, a left side edge 218, and a right side edge 220. The back panel 130 also has a front side 222 and a back side 224 opposite the front side 222.

Four recesses 226a, 226b, 226c and 226d are positioned around the perimeter of the back panel 130. In particular, a first recess 226a is positioned on the upper edge 214 toward the left side edge 218. A second recess 226b is positioned on the upper edge 214 toward the right side edge 220. A third recess 226c is positioned on the lower edge 216 toward the left side edge 218. A fourth recess 226d is positioned on the lower edge 216 toward the right side edge 220.

First and second accordion folds 228a, 228b extend from the left side edge 218 to the right side edge 220 in a horizontal direction 212. A first vertical fold 230a protrudes out of the front side 222 in a vertical direction 210 and extends from the first recess 226a to the third recess 226c. Similarly, a second vertical fold 230b protrudes out of the front side 222 in a vertical direction 210 and extends from the second recess 226b to the fourth recess 226d. The configuration of the accordion folds 228a, 228b and the vertical folds 230a, 230b will be explained in greater detail below in connection with FIG. 5.

The first vertical fold 230a intersects the first accordion fold 228a near the upper edge 214 and the left side edge 218. The first vertical fold 230a intersects the second accordion fold 228b near the lower edge 216 and the left side edge 218. The second vertical fold 230b intersects the first accordion fold 228a near the upper edge 214 and the right side edge 220. The second vertical fold 230b intersects the second accordion fold 228b near the lower edge 216 and the right side edge 220.

The back panel 130 includes an inflator interface 232. In the embodiment shown in FIG. 2, the inflator interface 232 takes the form of a rectangular orifice 232 that is centrally located with respect to the back panel 130 because it is positioned approximately halfway between the upper edge 214 and the lower edge 216, and approximately halfway between the left side edge 218 and the right side edge 220. The rectangular orifice 232 is sufficiently large to receive an adapter unit 138, as will be described in greater detail below. Four small orifices 234a, 234b, 234c and 234d are arranged in a horizontal direction 212 above the rectangular orifice 232 toward the upper edge 214. Similarly, four small orifices 234e, 234f, 234g and 234h are arranged in a horizontal direction 212 beneath the rectangular orifice 232 toward the lower edge 216. The small orifices 234a, 234b, 234c, 234d, 234e, 234f, 234g, and 234h are sufficiently large to receive a connector stud as will be described in greater detail below.

The front panel 132 has a front side 236 and a back side 238 opposite the front side 236. The front panel 132 has an upper peripheral region 240, a lower peripheral region 242, a left peripheral region 244, and a right peripheral region 246. The area of the front panel 132 is greater than the area of the back panel 130 to allow the peripheral regions 240, 242, 244 and 246 to be folded around the edges 214, 216, 218, and 220 of the back panel 130.

Both the back panel 130 and the front panel 132 are preferably made from a rigid material. For example, the back panel 130 and the front panel 132 may be made from sheet metal.

The inflator 136 may be of any suitable type or construction for supplying a medium for inflating the folded rigid knee airbag 112. For example, the inflator 136 may be a pyrotechnic inflator that uses the combustion of gas-generating material to generate an inflation fluid that inflates the folded rigid knee airbag 112. The inflator 136 includes a diffuser portion 247 for disseminating the inflation fluid. The inflator 136 also includes lead wires 142a–b which enable the inflator 136 to be in electrical communication with the sensor mechanism 140.

The back panel 130 includes an inflator interface 232 that is configured to receive the inflator 136. As shown in FIG. 2, the inflator interface 232 may take the form of a rectangular orifice 232 which is configured to receive an adapter unit 138. The adapter unit 138 includes a hollow rigid box 248 with an orifice 250 in one side. The inflator 136 may be inserted in the orifice 250. Of course, numerous other configurations for the inflator interface 232 will be readily apparent to one skilled in the art in light of the teachings contained herein. For example, the inflator interface 232 may be configured so that the inflator 136 may be directly inserted in the back panel 130.

When the inflator 136 discharges, it is desirable to prevent inflation fluid from escaping out of the orifice 250. This may be accomplished in a variety of ways. For example, a plastic sealing wedge 252 may be placed around the inflator 136. When the inflator 136 is inserted into the orifice 250, the sealing wedge 252 then creates a tight seal between the inflator 136 and the adapter unit 138. Alternatively, the diameter of the orifice 250 may simply be closely matched to the diameter of the inflator 136.

When the inflator 136 discharges, it is also desirable for the inflator 136 to be secured to the adapter unit 138 so that the force of the discharge does not cause the inflator 136 to be propelled out of the orifice 250 away from the adapter unit 138. This, too, may be accomplished in a variety of ways. For example, the inflator 136 may include a connector stud 254 attached to the diffuser portion 247 of the inflator 136. The adapter unit 138 may include a small orifice (not shown) opposite the orifice 250, the small orifice having a diameter which is slightly larger than the connector stud 254. The inflator 136 may be inserted through the orifice 250 so that the connector stud 254 extends through the small orifice. A nut (not shown) may then be used to secure the inflator 136 to the adapter unit 138. Of course, numerous other methods for attaching the inflator 136 to the adapter unit 138 will be readily apparent to one skilled in the art in light of the teachings contained herein.

The adapter unit 138 includes a plate 256. The hollow rigid box 248 may be an integral part of the plate 256, or it may be welded to the plate 256. Four connector studs 258a, 258b, 258c and 258d are arranged in a horizontal direction 212 along the distal edge of the plate 256, and four connector studs 258e, 258f, 258g and 258h are arranged in a horizontal direction 212 along the proximal edge of the plate 256. The portion of the plate 256 over which the hollow rigid box 248 sits includes an orifice (not shown), so that inflation fluid from the inflator 136 may be directed into the airbag 112.

Figure 3:
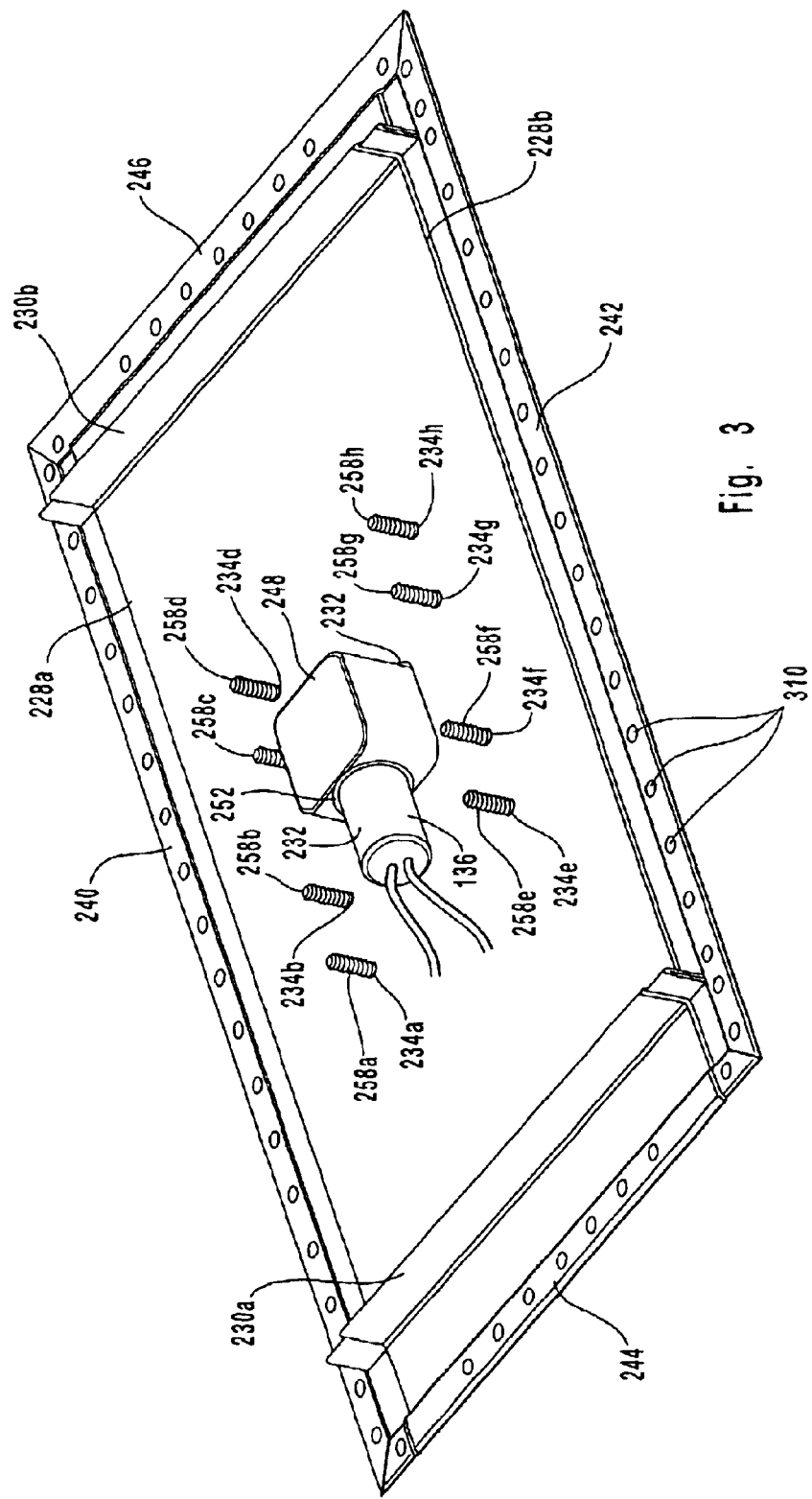
FIG. 3 is a top perspective view of the folded rigid knee airbag of FIG. 2 in its compact configuration.

FIG. 3 is a top perspective view of the folded rigid knee airbag 112 in its compact configuration. The upper peripheral region 240 of the front panel 132 is folded around the upper edge 214 of the back panel 130, the lower peripheral region 242 of the front panel 132 is folded around the lower edge 216 of the back panel 130, the left peripheral region 244 of the front panel 132 is folded around the left side edge 218 of the back panel 130, and the right peripheral region 246 of the front panel 132 is folded around the right side edge 220 of the back panel 130. A plurality of spot welds 310 are disposed around each of the peripheral regions 240, 242, 244 and 246 to attach the front panel 132 to the back panel 130. In an alternative embodiment, the area of the front panel 132 may be substantially equal to the area of the back panel 130, and the peripheral regions of the front panel 132 and the back panel 130 may be welded together in a continuous fashion.

The hollow rigid box 248 extends through the rectangular orifice 232. The connector studs 258a, 258b, 258c, 258d, 258e, 258f, 258g and 258h extend through the small orifices 234a, 234b, 234c, 234d, 234e, 234f, 234g and 234h. A plurality of nuts (not shown) may be used to secure the connector studs 258a, 258b, 258c, 258d, 258e, 258f, 258g and 258h to the back panel 130. The inflator 136 is inserted into the orifice 250 in the hollow rigid box 248 so that the connector stud 254 extends through the small orifice (not shown) in the hollow rigid box 248. A nut (not shown) may be used to secure the connector stud 254 to the hollow rigid box 248. The plastic sealing wedge 252 creates a tight seal between the inflator 136 and the adapter unit 138.

Figure 4:
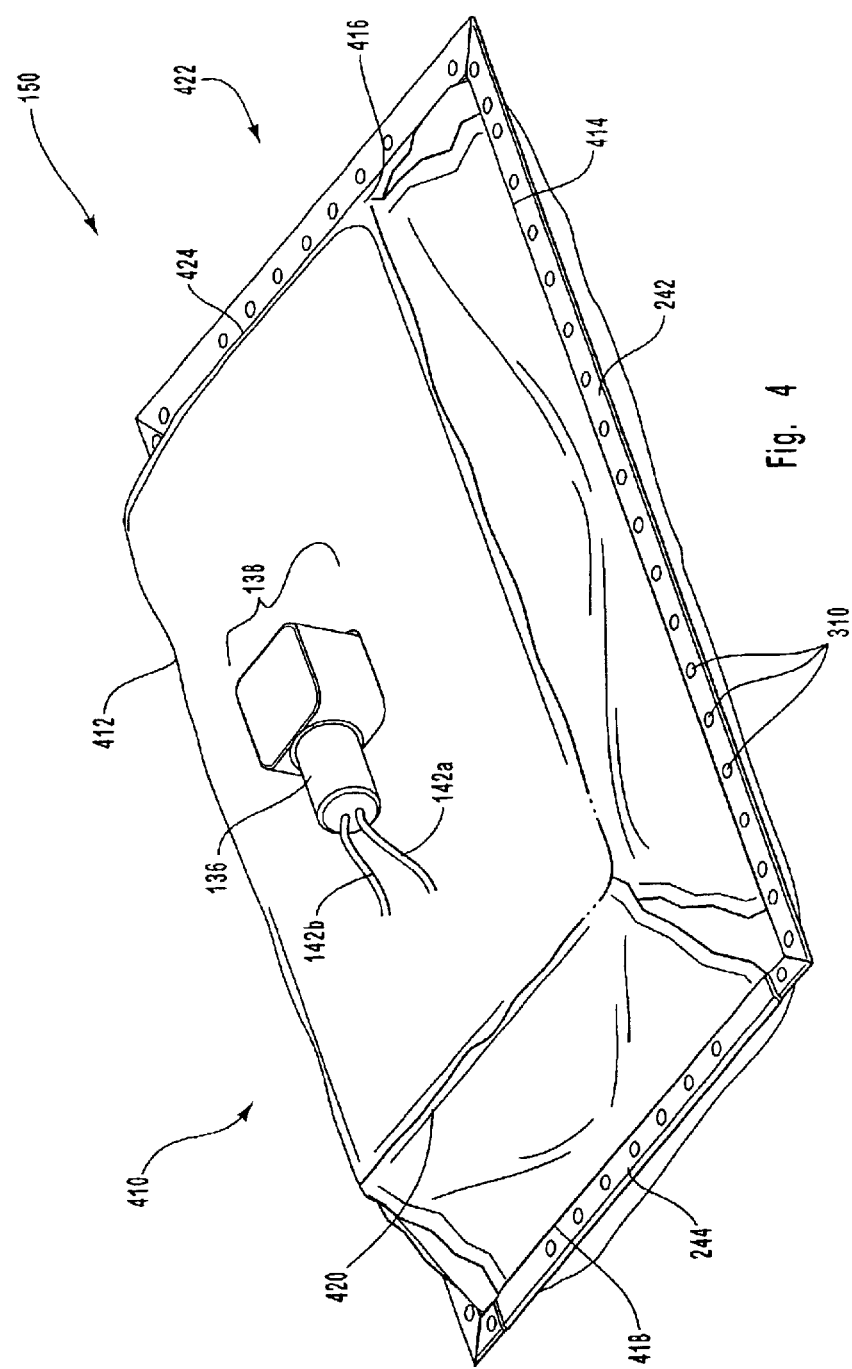
FIG. 4 is a top perspective view of the folded rigid knee airbag of FIGS. 1–3 in its inflated position.

FIG. 4 is a top perspective view of the folded rigid knee airbag 112 in its inflated position 150. The first at accordion fold 228a has unfolded to form a first substantially planar wall 410 having a first upper edge 412, and the second accordion fold 228b has unfolded to form a second substantially planar wall 414 opposite the first substantially planar wall 410 and having a second upper edge 416. Similarly, the first vertical fold 230a has unfolded to form a third substantially planar wall 418 having a third upper edge 420, and the second vertical fold 230b has unfolded to form a fourth substantially planar wall 422 opposite the third substantially planar wall 418 and having a fourth upper edge 424. The area of the back panel 130 enclosed by the upper edges 412, 416, 420, and 424 is substantially parallel to the front panel 132, and is substantially flat. The inflator 136 remains substantially stationary with respect to this substantially flat portion of the back panel 130.

Advantageously, the accordion folds 228a, 228b and the vertical folds 230a, 230b allow the front panel 132 to remain substantially flat during inflation. This permits the airbag 112 to inflate evenly, thereby reducing the likelihood that the trim panel 134 will interact with the vehicle occupant 114 at an angle during an accident. In addition, the cross-sectional area of the airbag 112 in its inflated configuration is about the same as the cross-sectional area of the airbag 112 in its compact configuration. This allows the airbag 112 to be more easily integrated into the interior of the vehicle 110.

The front panel 132 may be made to be thicker than the back panel 130. For example, in one embodiment the front panel 132 is made from sheet metal that is about 0.020 inches thick, while the back panel 130 is made from sheet metal that is about 0.014 inches thick. This difference in thickness further enhances the ability of the front panel 132 to remain substantially flat during inflation.

Figure 5:
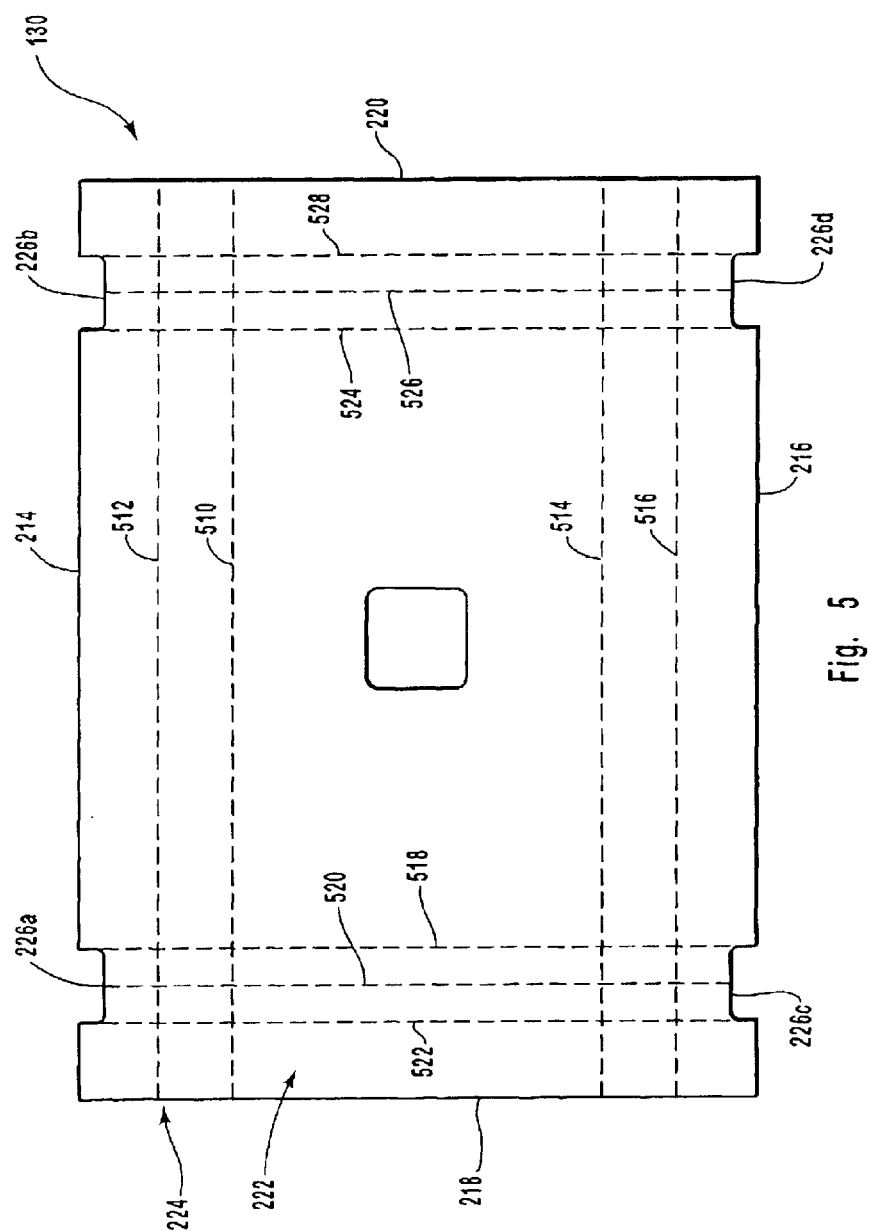
FIG. 5 is a top plan view of the back panel of the folded rigid knee airbag of FIGS. 1–4 in its pre-folded state.

FIG. 5 is a top plan view of the back panel 130 in its pre-folded state. One example of how the accordion folds 228a, 228b and the vertical folds 230a, 230b may be created will now be explained.

To create the first accordion fold 228a, the upper edge 214 is first bent at a 180° angle toward the back side 224 along the fold line 510. The upper edge 214 is then bent at a 180° angle toward the front side 222 along the fold line 512.

To create the second accordion fold 228b, the lower edge 216 is first bent at a 180° angle toward the back side 224 along the fold line 514. The lower edge 216 is then bent at a 180° angle toward the front side 222 along the fold line 516.

To create the first vertical fold 230a, the left side edge 218 is first bent at a 90° angle toward the front side 222 along the fold line 518. The left side edge 218 is then bent at a 180° angle toward the back side 224 along the fold line 520. Finally, the left side edge 218 is bent at a 90° angle toward the front side 222 along the fold line 522.

To create the second vertical fold 230b, the right side edge 220 is first bent at a 90° angle toward the front side 222 along the fold line 524. The right side edge 220 is then bent at a 180° angle toward the back side 224 along the fold line 526. Finally, the right side edge 220 is bent at a 90° angle toward the front side 222 along the fold line 528.

Of course, numerous other methods for creating the accordion folds 228a, 228b and the vertical folds 230a, 230b will be readily apparent to one skilled in the art in light of the teachings contained herein.

In FIG. 1, the lower portion of the instrument panel 124 is substantially parallel to the lower body of the vehicle occupant 114. Thus, in the embodiment shown in FIGS. 1 through 5, the front panel 132 is disposed substantially parallel to the back panel 130 after inflation, thereby reducing the likelihood that the trim panel 134 will interact with the vehicle occupant 114 at an angle during an accident.

Figure 6:
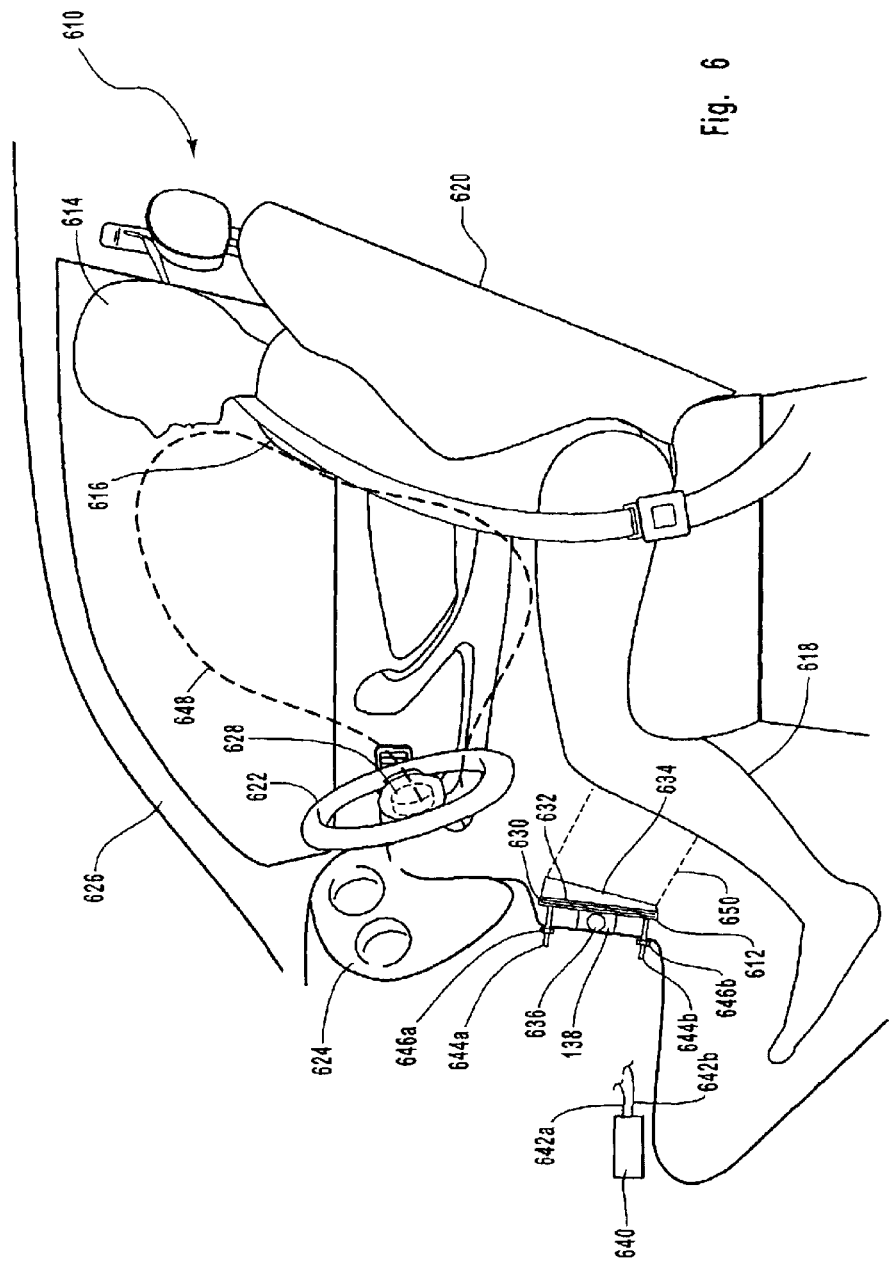
FIG. 6 is a side cutaway view of an interior portion of a vehicle having an alternative folded rigid knee airbag installed.

FIG. 6 is a side cutaway view of an interior portion of a vehicle 610 having an alternative folded rigid knee airbag 612 installed. Many of the elements shown in FIG. 6 correspond to elements in FIG. 1 and are labeled with similar reference numbers. For example, the occupant 114 in FIG. 1 is labeled 614 in FIG. 6.

In FIG. 6, the lower portion of the instrument panel 624 is disposed at an angle relative to the lower body of the vehicle occupant 614. Thus, to reduce the likelihood that the trim panel 634 will interact with the vehicle occupant 614 at an angle during an accident, the front panel 632 must be disposed at an angle relative to the back panel 630 after inflation.

Figure 7:
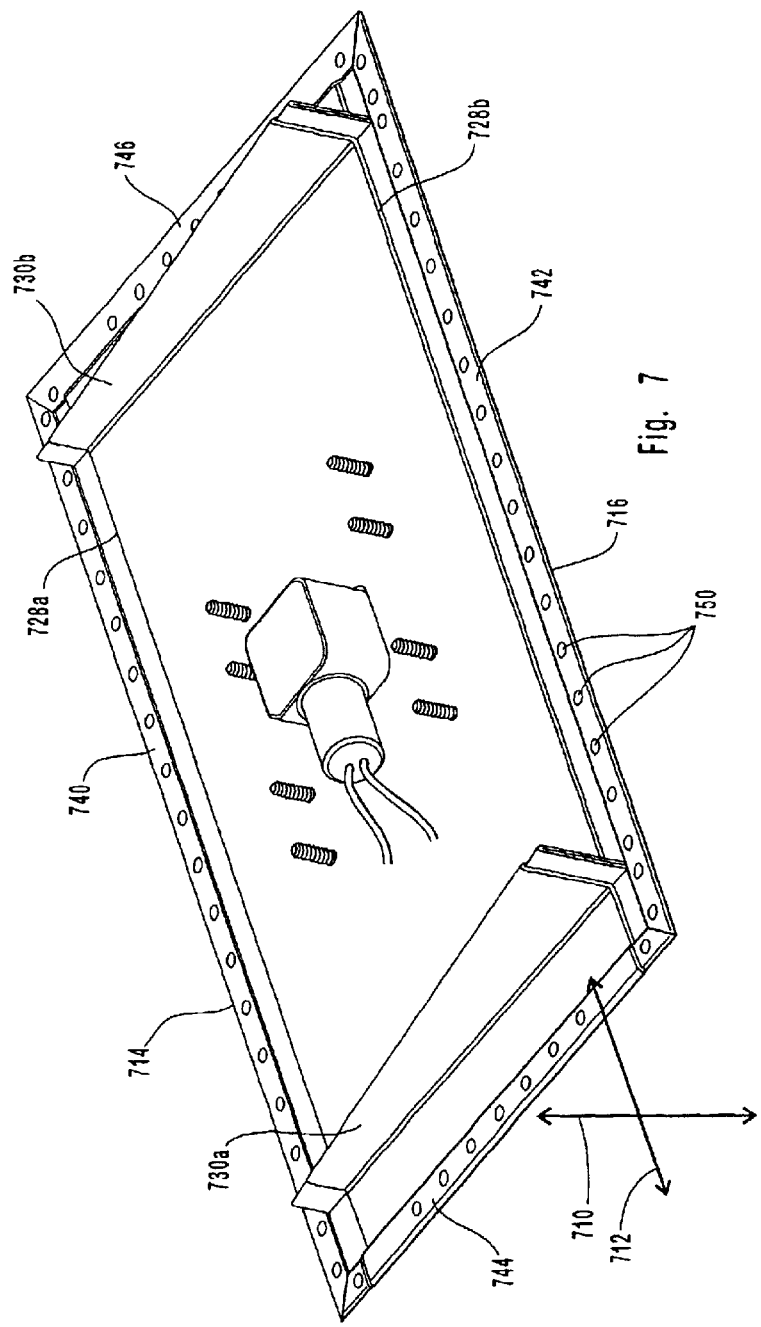
FIG. 7 is a top perspective view of the folded rigid knee airbag of FIG. 6 in its compact configuration.

FIG. 7 is a top perspective view of the folded rigid knee airbag 612 in its compact configuration. Although not shown explicitly in FIG. 7, the back panel 630 includes an upper edge 714, a lower edge 716, a left side edge 718, and a right side edge 720 similar to the upper edge 214, the lower edge 216, the left side edge 218, and the right side edge 220 shown in FIG. 2. In addition, the back panel 630 includes four recesses 726a, 726b, 726c and 726d disposed around the peripheral region of the back panel 630 in a manner similar to the four recesses 226a, 226b, 226c and 226d shown in FIG. 2. The upper edge 714, the lower edge 716, the left side edge 718, the right side edge 720, and the four recesses 726a, 726b, 726c and 726d are explicitly shown below in FIG. 9.

The upper peripheral region 740 of the front panel 632 is folded around the upper edge 714 of the back panel 630, the lower peripheral region 742 of the front panel 632 is folded around the lower edge 716 of the back panel 630, the left peripheral region 744 of the front panel 632 is folded around the left side edge 718 of the back panel 630, and the right peripheral region 746 of the front panel 632 is folded around the right side edge 720 of the back panel 630. A plurality of spot welds 750 are disposed around each of the peripheral regions 740, 742, 744, and 746 to attach the front panel 632 to the back panel 630.

The back panel 630 includes first and second accordion folds 728a, 728b which extend from the left side edge 718 to the right side edge 720 in a horizontal direction 712. In the airbag 112 shown in FIGS. 1–5, the first and second accordion folds 228a and 228b are approximately the same size. In the airbag 612 shown in FIG. 7, however, the second accordion fold 728b is substantially larger than the first accordion fold 728a.

A first vertical fold 730a protrudes out of the back panel 630 in a vertical direction 710 and extends from the first recess 726a to the third recess 726c. Similarly, a second vertical fold 730b protrudes out of the back panel 630 in a vertical direction 710 and extends from the second recess 726b to the fourth recess 726d. In the back panel 130 shown in FIGS. 1–5, the first and second vertical folds 230a, 230b have a uniform height. However, in the back panel 630 shown in FIG. 7, the height of the first and second vertical folds 730a, 730b increases moving in a direction from the upper edge 714 to the lower edge 716.

Figure 8:
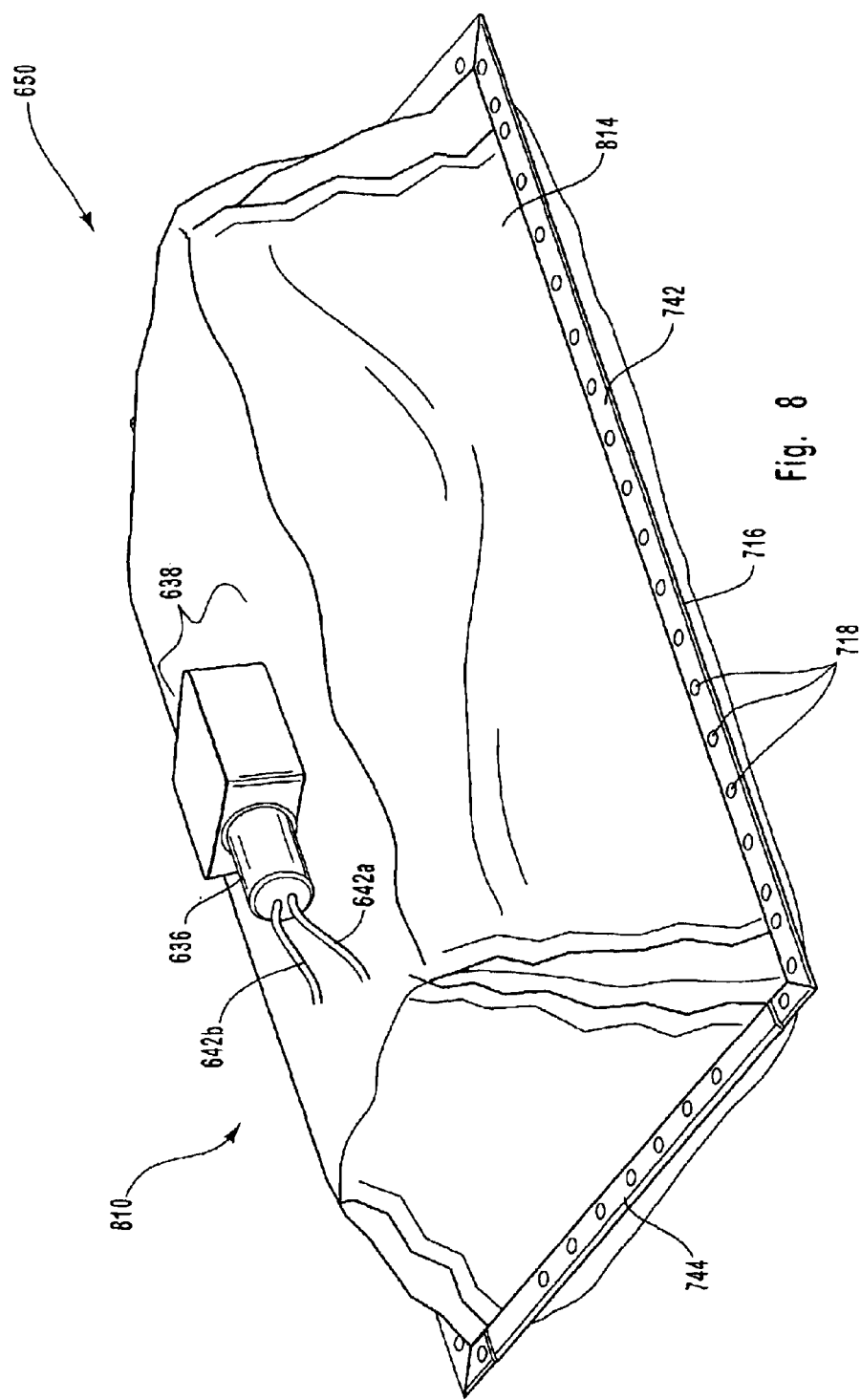
FIG. 8 is a top perspective view of the folded rigid knee airbag of FIGS. 6–7 in its inflated position.

FIG. 8 is a top perspective view of the folded rigid knee airbag 612 of FIG. 7 in its inflated position 650. When the airbag 612 is inflated, the first accordion fold 728a unfolds to form a first substantially planar wall 810, and the second accordion fold 728b unfolds to form a second substantially planar wall 814 opposite the first substantially planar wall 810. In the airbag 112 shown in FIG. 4 in its inflated position 150, the first substantially planar wall 410 is about the same height as the second substantially planar wall 414. In the airbag 612 shown in FIG. 8 in its inflated position 650, however, the second substantially planar wall 814 is taller than the first substantially planar wall 810.

Figure 9:
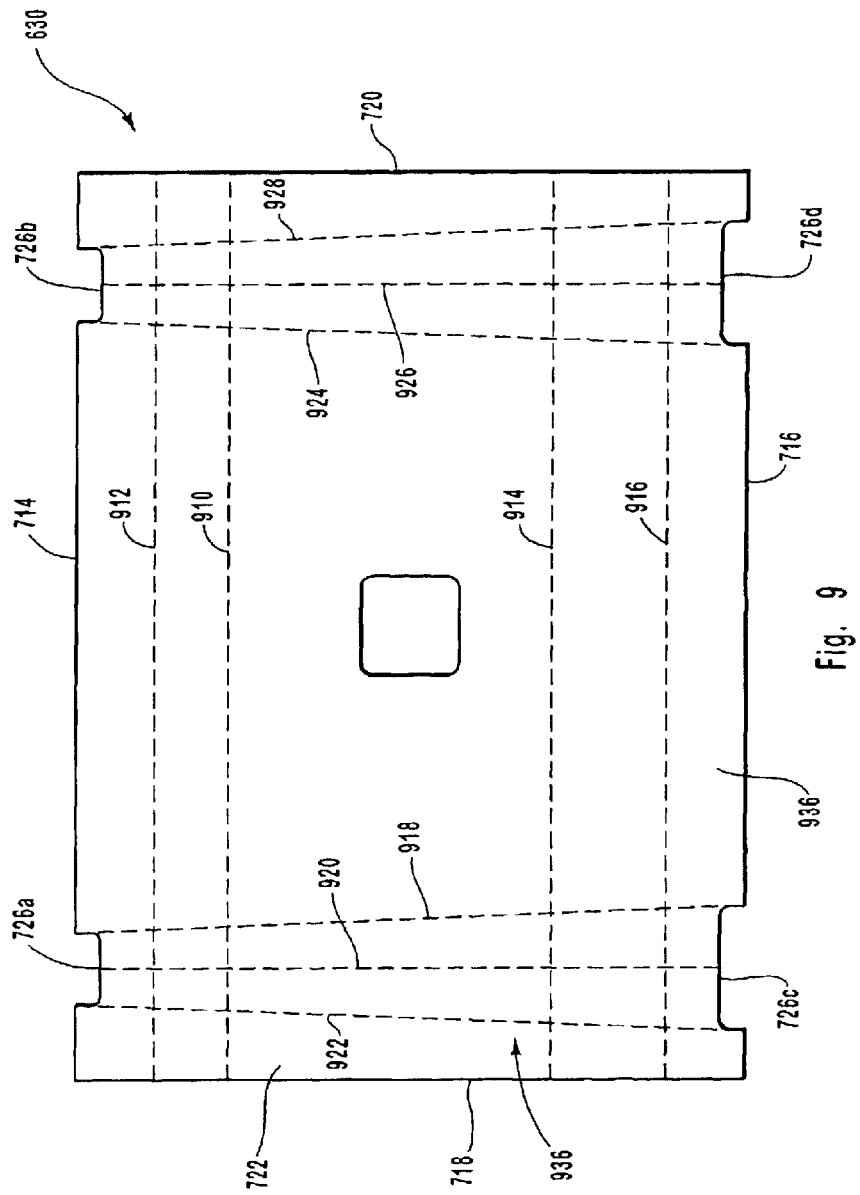
FIG. 9 is a top plan view of the back panel of the folded rigid knee airbag of FIGS. 6–8 in its pre-folded state.

FIG. 9 is a top plan view of the back panel 630 of FIGS. 6–8 in its pre-folded state. One example of how the accordion folds 728a, 728b and the vertical folds 730a, 730b shown in FIG. 7 may be created will now be explained.

The back panel 630 includes a front side 936 and a back side (not shown) opposite the front side 936. To create the first accordion fold 728a, the upper edge 714 is first bent at a 180° angle toward the back side along the fold line 910. The upper edge 714 is then bent at a 180° angle toward the front side 936 along the fold line 912.

To create the second accordion fold 728b, the lower edge 716 is first bent at a 180° angle toward the back side along the fold line 914. The lower edge 716 is then bent at a 180° angle toward the front side 936 along the fold line 916.

To create the first vertical fold 730a, the left side edge 718 is first bent at a 90° angle toward the front side 936 along the fold line 918. The left side edge 718 is then bent at a 180° angle toward the back side along the fold line 920. Finally, the left side edge 718 is bent at a 90° angle toward the front side 936 along the fold line 922.

To create the second vertical fold 730b, the right side edge 720 is first bent at a 90° angle toward the front side 936 along the fold line 924. The right side edge 720 is then bent at a 180° angle toward the back side along the fold line 926. Finally, the right side edge 720 is bent at a 90° angle toward the front side 936 along the fold line 928.

In FIG. 5, the fold lines 518, 520, 522, 524, 526 and 528 are substantially parallel to one another. This enables the height of the vertical folds 230a, 230b to be substantially uniform. In contrast, in FIG. 9 the distance between the fold lines 918 and 920 increases moving in a direction from the upper edge 714 to the lower edge 716. Similarly, the distance between the fold lines 918 and 920, between the fold lines 924 and 926, and between the fold lines 926 and 928 increases moving in a direction from the upper edge 714 to the lower edge 716. This enables the height of the vertical folds 730a, 730b to increase moving in a direction from the upper edge 714 to the lower edge 716.

From the above discussion, it will be appreciated that many of the problems associated with known knee airbags are addressed by the teachings of the present invention. The present invention provides a folded rigid knee airbag with a front panel that remains substantially flat during inflation. This permits the airbag to inflate evenly, thereby reducing the likelihood that the airbag, or a trim panel attached to the airbag, will interact with the vehicle occupant at an angle during an accident. In addition, the cross-sectional area of the airbag in its inflated configuration is about the same as the cross-sectional area of the airbag in its compact configuration. This allows the airbag to be more easily integrated into the interior of the vehicle.

The present invention may be embodied in other specific forms without departing from its essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An airbag for preventing the lower body portion of a vehicle occupant from being propelled forward during a collision, comprising:

a front panel made from a rigid material;

a back panel made from a rigid material and attached to the front panel, the back panel comprising an inflator interface configured to receive an inflator such that the inflator is substantially stationary with respect to a substantially flat portion of the back panel during inflation of the airbag;

wherein the back panel comprises a plurality of folds that cross each other such that the front panel remains substantially flat during discharge of the inflator.

2. The airbag of claim 1, wherein the back panel is configured so that the front panel is disposed substantially parallel to the back panel after discharge of the inflator.

3. The airbag of claim 1, wherein the back panel is configured so that the front panel is disposed at an angle relative to the back panel after discharge of the inflator.

4. The airbag of claim 1, wherein the back panel and the front panel are made from sheet metal.

5. The airbag of claim 1, wherein the front panel is thicker than the back panel.

6. The airbag of claim 1, wherein the front panel comprises a peripheral region, wherein the back panel comprises a peripheral region, and wherein the peripheral region of the front panel is folded around the peripheral region of the back panel.

7. An airbag for preventing the lower body portion of a vehicle occupant from being propelled forward during a collision, comprising:

a front panel made from a rigid material;

a back panel made from a rigid material and attached to the front panel, the back panel comprising an inflator interface configured to receive an inflator, wherein the inflator interface is centrally located with respect to the back panel, the back panel further comprising a folded portion configured to unfold during discharge of the inflator to form a substantially planar portion.

8. The airbag of claim 7, wherein the back panel is configured so that the front panel is disposed substantially parallel to the back panel after discharge of the inflator.

9. The airbag of claim 7, wherein the back panel is configured so that the front panel is disposed at an angle relative to the back panel after discharge of the inflator.

10. The airbag of claim 7, wherein the back panel and the front panel are made from sheet metal.

11. The airbag of claim 7, wherein the front panel is thicker than the back panel.

12. The airbag of claim 7, wherein the front panel comprises a peripheral region, wherein the back panel comprises a peripheral region, and wherein the peripheral region of the front panel is folded around the peripheral region of the back panel.

13. An airbag for preventing the lower body portion of a vehicle occupant from being propelled forward during a collision, comprising:
- a front panel made from a rigid material;
- a back panel made from a rigid material and attached to the front panel, the back panel comprising:
  - an inflator interface configured to receive an inflator;
  - a first accordion fold configured to unfold during discharge of the inflator to form a first substantially planar wall;
  - a second accordion fold configured to unfold during discharge of the inflator to form a second substantially planar wall opposite the first substantially planar wall;
  - a first vertical fold configured to unfold during discharge of the inflator to form a third substantially planar wall adjacent the first and second substantially planar walls; and
  - a second vertical fold configured to unfold during discharge of the inflator to form a fourth substantially planar wall opposite the third substantially planar wall.

14. The airbag of claim 13, wherein the size of the second accordion fold is substantially equal to the size of the first accordion fold.

15. The airbag of claim 14, wherein the first and second vertical folds extend from the first edge to the second edge, and wherein the first and second vertical folds have a substantially uniform height.

16. The airbag of claim 13, wherein the size of the second accordion fold is greater than the size of the first accordion fold.

17. The airbag of claim 16, wherein the first and second vertical folds extend from the first edge to the second edge, and wherein the height of the first and second vertical folds increases moving in a direction from the first edge to the second edge.

18. The airbag of claim 13, wherein the back panel and the front panel are made from sheet metal.

19. The airbag of claim 13, wherein the front panel is thicker than the back panel.

20. The airbag of claim 13, wherein the front panel comprises a peripheral region, wherein the back panel comprises a peripheral region, and wherein the peripheral region of the front panel is folded around the peripheral region of the back panel.

21. An airbag system for preventing the lower body portion of a vehicle occupant from being propelled forward during a collision, comprising:
- a front panel made from a rigid material, the front panel having a first side and a second side;
- a decorative trim panel attached to the first side of the front panel;
- a back panel made from a rigid material and attached to the second side of the front panel, the back panel comprising:
  - an inflator interface configured to receive an inflator;
  - a first vertical fold configured to unfold during discharge of the inflator to form a first substantially planar wall;
  - a second vertical fold configured to unfold during discharge of the inflator to form a second substantially planar wall opposite the first substantially planar wall;
  - a first accordion fold configured to unfold during discharge of the inflator to form a third substantially planar wall adjacent the first and second substantially planar walls; and
  - a second accordion fold configured to unfold during discharge of the inflator to form a fourth substantially planar wall opposite the third substantially planar wall.

22. The airbag of claim 21, wherein the size of the second accordion fold is substantially equal to the size of the first accordion fold.

23. The airbag of claim 22, wherein the first and second vertical folds extend from the first edge to the second edge, and wherein the first and second vertical folds have a substantially uniform height.

24. The airbag of claim 21, wherein the size of the second accordion fold is greater than the size of the first accordion fold.

25. The airbag of claim 24, wherein the first and second vertical folds extend from the first edge to the second edge, and wherein the height of the first and second vertical folds increases moving in a direction from the first edge to the second edge.

26. The airbag of claim 21, wherein the back panel and the front panel are made from sheet metal.

27. The airbag of claim 21, wherein the front panel is thicker than the back panel.

28. The airbag of claim 21, wherein the front panel comprises a peripheral region, wherein the back panel comprises a peripheral region, and wherein the peripheral region of the front panel is folded around the peripheral region of the back panel.

* * * * *